US008666078B2

(12) United States Patent
Bai et al.

(10) Patent No.: US 8,666,078 B2
(45) Date of Patent: Mar. 4, 2014

(54) METHOD AND SYSTEM FOR GENERATING CIPHER KEY DURING SWITCHING

(75) Inventors: Xiaochun Bai, Shenzhen (CN); Xuwu Zhang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 13/258,981

(22) PCT Filed: May 13, 2010

(86) PCT No.: PCT/CN2010/072727
§ 371 (c)(1),
(2), (4) Date: Sep. 22, 2011

(87) PCT Pub. No.: WO2010/142185
PCT Pub. Date: Dec. 16, 2010

(65) Prior Publication Data
US 2012/0082315 A1 Apr. 5, 2012

(30) Foreign Application Priority Data
Jun. 12, 2009 (CN) .......................... 2009 1 0203765

(51) Int. Cl.
*H04K 1/00* (2006.01)
(52) U.S. Cl.
USPC ........................................................ 380/272
(58) Field of Classification Search
USPC ........................................................ 380/272
See application file for complete search history.

(56) References Cited

U.S. PATENT DOCUMENTS

| 2009/0220087 | A1* | 9/2009 | Brusilovsky et al. | ......... 380/272 |
| 2011/0033053 | A1* | 2/2011 | Gan et al. | ...................... 380/272 |
| 2011/0098048 | A1* | 4/2011 | Zhang et al. | .................. 455/438 |

FOREIGN PATENT DOCUMENTS

| CN | 1921379 A | 2/2007 |
| CN | 101232731 A | 7/2008 |
| CN | 101309503 A | 11/2008 |
| WO | 2007094989 | 8/2007 |
| WO | 2008088092 | 7/2008 |
| WO | 2009038522 | 3/2009 |

OTHER PUBLICATIONS

International Preliminary Report on Patentability for PCT/CN2010/072727 dated Dec. 12, 2011.
International Search Report for PCT/CN2010/072727, English translation attached to original, Both completed by the Chinese Patent Office on Aug. 5, 2010, All together 6 Pages.

* cited by examiner

Primary Examiner — William Powers
Assistant Examiner — Abiy Getachew
(74) Attorney, Agent, or Firm — Brooks Kushman P.C.

(57) ABSTRACT

A method and a system for generating a key in a handover process, wherein the method comprises the following steps of: according to an evolved Node-B (eNB) (102) of a User Equipment (UE) (101), i.e. a source eNB, a mobility management entity (MME) (103) learning all adjacent eNBs of the source eNB (S130), and generating keys for the source eNB and each of the adjacent eNBs respectively (S140), encrypting the keys with a corresponding eNB public key respectively to obtain cipher texts (S150), and sending all cipher texts, keys and eNB identifiers to the UE (S160); in a handover process of the UE, a target eNB obtaining a cipher text corresponding to the target eNB from the UE and decrypting the cipher text with its own private key to obtain the key (S260).

7 Claims, 4 Drawing Sheets

METHOD AND SYSTEM FOR GENERATING CIPHER KEY DURING SWITCHING

CROSS-REFERENCE TO RELATED APPLICATION

This application is the U.S. national phase of PCT Appln. No. PCT/CN2010/072727 filed May 13, 2010 which claims priority to Chinese application 200910203765.4 filed Jun. 12, 2009, the disclosures of which are incorporated in their entirety by reference herein.

TECHNICAL FIELD

The present invention relates to the communication field, and in particular, to a method and a system for generating a key in a handover process.

BACKGROUND ART

A 3GPP Evolved Packet System (EPS) is composed of an Evolved UMTS Terrestrial Radio Access Network (EU-TRAN) and an Evolved Packet Core (EPC).

Wherein, an EPC includes a MME (mobility management entity), which is responsible for control plane-related works such as mobility management, processing of non-access layer signaling, and user security mode management. Wherein, the MME stores Key Access Security Management Entity (KASME) of the EUTRAN, and uses the KASME and an uplink NAS SQN (non-access layer sequence number) to generate a Key eNB (KeNB) of the access layer to be used by the eNB.

Wherein, in the evolved UTRAN, the base station is an evolved Node-B (eNB), which is mainly responsible for wireless communication, wireless communication management and mobility context management.

Wherein, the communication between the eNB and EPC is encrypted using network domain security mechanism, i.e., the EPC encrypts a message using the public key of the eNB, and the target eNB decrypts the message using its own private key.

An eNB in 3GPP includes a plurality of cells, and a handover of a User Equipment (UE) is between the cells, therefore, the handover of a UE may be implemented within the same eNB, or between two different eNBs.

The latest method for generating a handover state key is:

in initial connection, a MME generating a Next Hop parameter (NH), a NH Chaining Counter (NCC) and Kenb.

Kenb=KDF (Kasme, NasCount);

(note: KDF is a key generating function, NasCount is non-access layer uplink message count)

NH=NULL; NCC=0;

After the above initialization, the MME sends the Kenb to the eNB, generates an initial key Kenb. The UE also obtains the Kenb in the same way as the MME.

During a handover, a source eNB calculates out a Kenb* according to the Kenb, and transmits the NH and the Kenb* to the target eNB, the source eNB carries NCC in a handover reconfiguration message and sends it to the UE. The UE calculates out the Kenb according to the NH that is stored by itself. The calculation formula is:

Kenb=KDF (Kenb*, NH);

The target eNB also calculates out the Kenb in the same way.

The MME updates the NH value in the following way:

NH=KDF (Kasme, NH);

and at every time of updating, the NCC is added with 1.

After updating the NH, the MME transmits the updated NH value and NCC to the target eNB, and the UE compares the received NCC with the NCC that is stored by itself, and calculates a new NH value according to the difference between times of the NCC.

During the entire handover process, the UE, eNB and MME need to negotiate on NCC and the NH value, and obtain the key Kenb by means of updating the NH value for multiple times.

The disadvantage of the scheme is that the source eNB can obtain the key Kenb in the next hop of the UE through deduction, thus causing potential safety hazard, meanwhile the whole calculation process is complicated, and many parameters need to be synchronized.

SUMMARY OF THE INVENTION

The technical problem to be solved in the present invention is to provide a method and a system for generating a key in a handover process so as to overcome the problem in the prior art that the source eNB can obtain the key Kenb in the next hop of the UE through deduction, which may cause potential safety hazard.

In order to solve the above technical problem, the present invention provides a method for generating a key in a handover process, comprising the following steps of:

according to a current evolved Node-B (eNB) of a User Equipment (UE), i.e. a source eNB, a mobility management entity (MME) learning all adjacent eNBs of the source eNB, and generating keys for the source eNB and each of the adjacent eNBs respectively, encrypting the keys with a corresponding eNB public key respectively to obtain cipher text, and sending all cipher texts, keys and eNB identifiers to the UE; and, in a handover process of the UE, a target eNB obtaining the cipher text corresponding to the target eNB from the UE and decrypting the cipher text with its own private key to obtain the key.

The above method is also characterized in that:

the cipher text corresponding to the target eNB is directly sent to the target eNB by the UE.

The above method is also characterized in that:

said step of the target eNB obtaining the cipher text corresponding to the target eNB from the UE comprises the following steps of:

the source eNB making a handover decision for the UE according to a measurement report reported by the UE, and determining a target cell of a next hop;

the source eNB sending a handover message to the UE, wherein the handover message carries a eNB identifier of the target cell, i.e., a target eNB identifier;

the UE obtaining the cipher text and key corresponding to the target eNB according to the target eNB identifier, and cipher texts, keys and eNB identifiers that are stored according to corresponding relationships; and, the UE carrying the cipher text corresponding to the target eNB in a handover completion message and sending the handover completion message to the target eNB.

The method further comprises the following step after said step of obtaining the key:

the UE using the key corresponding to the target eNB as an interactive root key with the target eNB.

The above method is also characterized in that:

the cipher text corresponding to the target eNB is sent to the target eNB by the source eNB after the UE transmits all cipher texts and corresponding eNB identifiers to the source eNB.

The above method is also characterized in that:

said step of the target eNB obtaining a cipher text corresponding to the target eNB from the UE comprises the following steps of:

the UE sending the reported measurement report carrying all cipher texts and corresponding eNB identifiers to the source eNB;

the source eNB making a handover decision according to measurement information of the UE and determining a target cell; and, the source eNB obtaining a corresponding cipher text according to the eNB of the target cell, i.e., the target eNB, and sending the cipher text corresponding to target eNB to the target eNB;

The method further comprises the following steps after said step of obtaining the key:

the target eNB returning a handover confirmation message to the source eNB;

the source eNB sending a handover command carrying the target eNB identifier to the UE; and, the UE obtaining the key corresponding to the target eNB according to the target eNB identifier.

The above method is also characterized in that:

the method further comprises, prior to said step of encrypting the keys with a corresponding eNB public key respectively to obtain cipher texts, the step of: the MME signing for the keys;

the method further comprises, after said of decrypting the cipher text with its own private key and prior to said step of obtaining the key, the step of: authenticating with a public key of the MME.

In order to solve the above technical problem, the present invention also provides a system for generating a key in a handover process, comprising a UE, a source eNB, a target eNB and a MME, the MME is configured to: according to an evolved Node-B (eNB) of a User Equipment (UE), i.e. a source eNB, obtain all adjacent eNBs of the source eNB, and generate keys for the source eNB and each of the adjacent eNBs respectively, encrypt the keys with a corresponding eNB public key respectively to obtain cipher texts, and send all cipher texts, keys and eNB identifiers to the UE;

the target eNB is configured to: obtain a cipher text corresponding to the target eNB in the handover process of the UE and decrypt the cipher text with its own private key to obtain the key.

The above system is also characterized in that:

the UE is configured to: send the cipher text corresponding to the target eNB to the target eNB in the handover process.

The above system is also characterized in that:

the UE is configured to: send all cipher texts and corresponding eNB identifiers to the source eNB;

the source eNB is configured to: send the cipher text corresponding to the target eNB to the target eNB in the handover process of the UE.

The above system is also characterized in that:

the MME is also configured to: sign for the keys before encrypting the keys with a corresponding eNB public key respectively to obtain cipher texts;

the target eNB is also configured to: authenticate with a public key of the MME after decrypting the received cipher text with its own private key and before obtaining the key.

The present invention solves the problem in the existing method that the source eNB can know the Kenb of the next hop UE, and the key generating method in the handover process is simplified by completing handover data preparation when the UE is in a non-handover state, and the MME does not need to participate in the handover process, thus improving the radio performance during the handover process.

PREFERRED EMBODIMENTS OF THE INVENTION

In the present invention, a MME is used to generate a handover key and encrypt the key, and then send the cipher text to the UE. When the UE hands over, the target eNB obtains the cipher text and decrypts the cipher text to obtain the key.

Specifically, the method comprises the following steps:

1. the MME obtaining all adjacent eNBs of the source eNB, i.e., all eNBs to which the UE may hand over, according to the eNB of the UE (i.e. a source eNB);

2. the MME randomly generating keys for the source eNB and each of the adjacent eNBs respectively, encrypting the keys with a corresponding eNB public key to obtain cipher texts S*, and sending all cipher texts S*, Kenb and eNB identifiers enbIDs to the UE;

3. in a handover process of the UE, a target eNB obtaining a cipher text S* corresponding to the target eNB from the UE and decrypting the cipher text with its own private key to obtain the key Kenb.

Wherein, the target eNB can obtain the cipher text S* corresponding to the target eNB from the UE in the following way:

In the handover process, the UE directly sends the cipher text S* corresponding to the target eNB to the target eNB; or the UE transmits all cipher texts S* and corresponding eNB identifiers enbIDs to the source eNB, and in the handover process of the UE, the source eNB sends the cipher text S* corresponding to the target eNB to the target eNB.

The description will be described in detail with reference to the drawings and the specific examples.

In the embodiments of present invention, there is provided a method for generating a key in the handover process, comprising following steps:

The first step: configuring the MME, wherein a data table is configured at the MME end, which records a group of eNBs corresponding to any eNB that may have a handover relationship with it, this group of eNBs is referred to as adjacent eNBs. That is, the UE sets up a connection an eNB (i.e., a source eNB), and if handover occurs, then the target eNB is bound to be included in the adjacent eNBs.

The relationship between the adjacent eNBs and the source eNB may be intersection relationship or inclusion relationship, and as long as they may have a direct handover relationship between them, they are considered to have an adjacency relationship.

Figure 1:
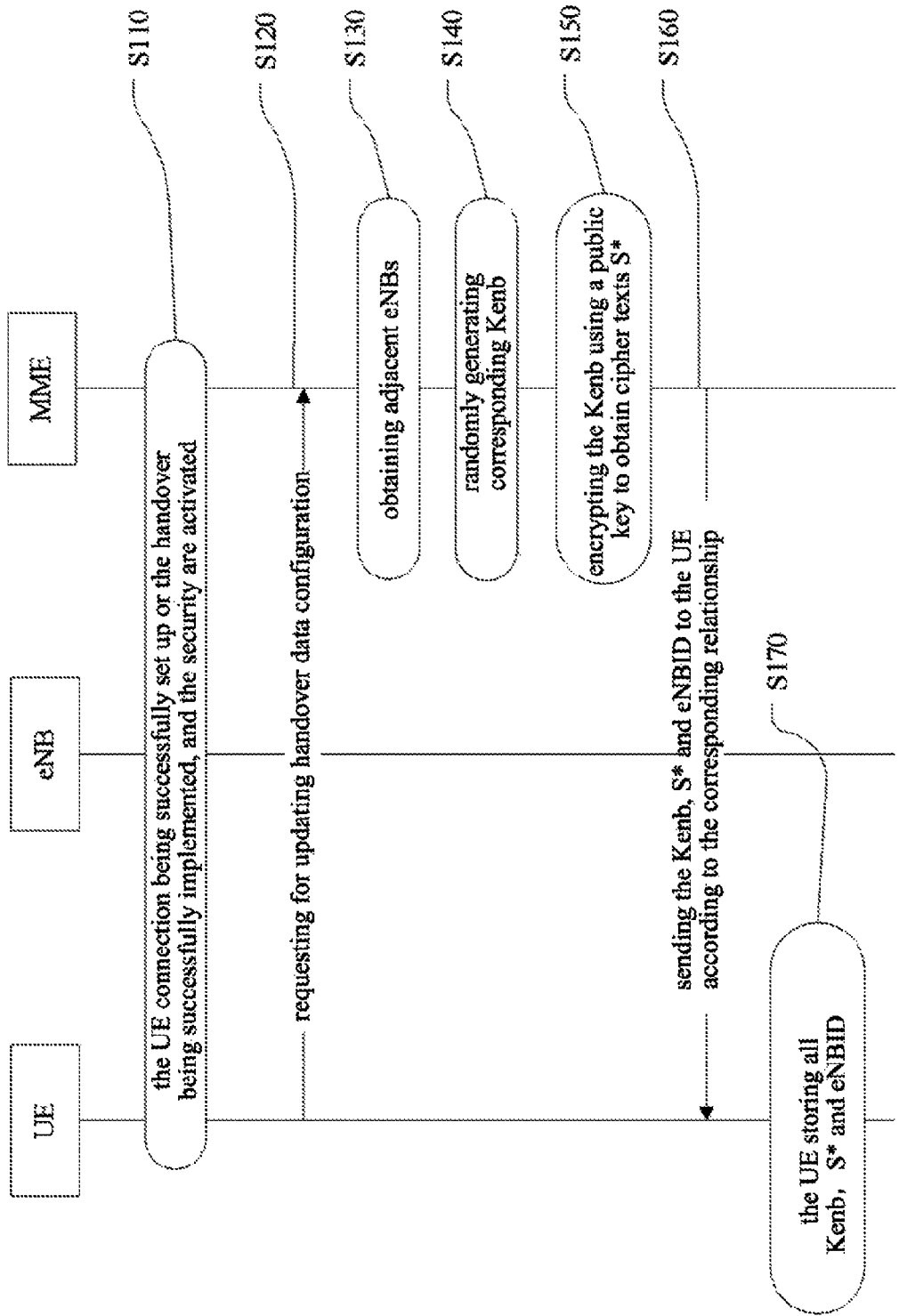
FIG. 1 illustrates the process of the MME configuring handover parameters for the UE after the UE has set up a connection according to an embodiment of the present invention.

The second step: on the basis of the data support in the first step, after the UE sets up a normal connection, implementing handover data configuration, which further includes the following sub-steps (as shown in FIG. 1):

S110, the UE connection being successfully set up or the handover being successfully implemented, and the access layer and non-access layer security are activated;

S120, the UE requesting the MME for updating handover data configuration;

S130, according to the eNB of the UE, the MME obtaining all adjacent eNBs of this eNB using the data in the first step;

S140, the MME randomly generating a group of keys, Kenb, for each of the adjacent eNBs and the eNB of the UE, wherein the Kenb corresponds to each of the above eNBs one by one;

S150: the MME encrypting the Kenb using a public key of the eNB according to the corresponding relationship in S140, obtaining a group of cipher texts S*, wherein the S* also corresponds to the eNB one by one;

S160, the MME informing the UE of the Kenb, S* and eNBID generated above according to the corresponding relationship via the non-access layer message;

S170, the UE storing Kenb, S* and eNBID according to the corresponding relationship.

Figure 2:
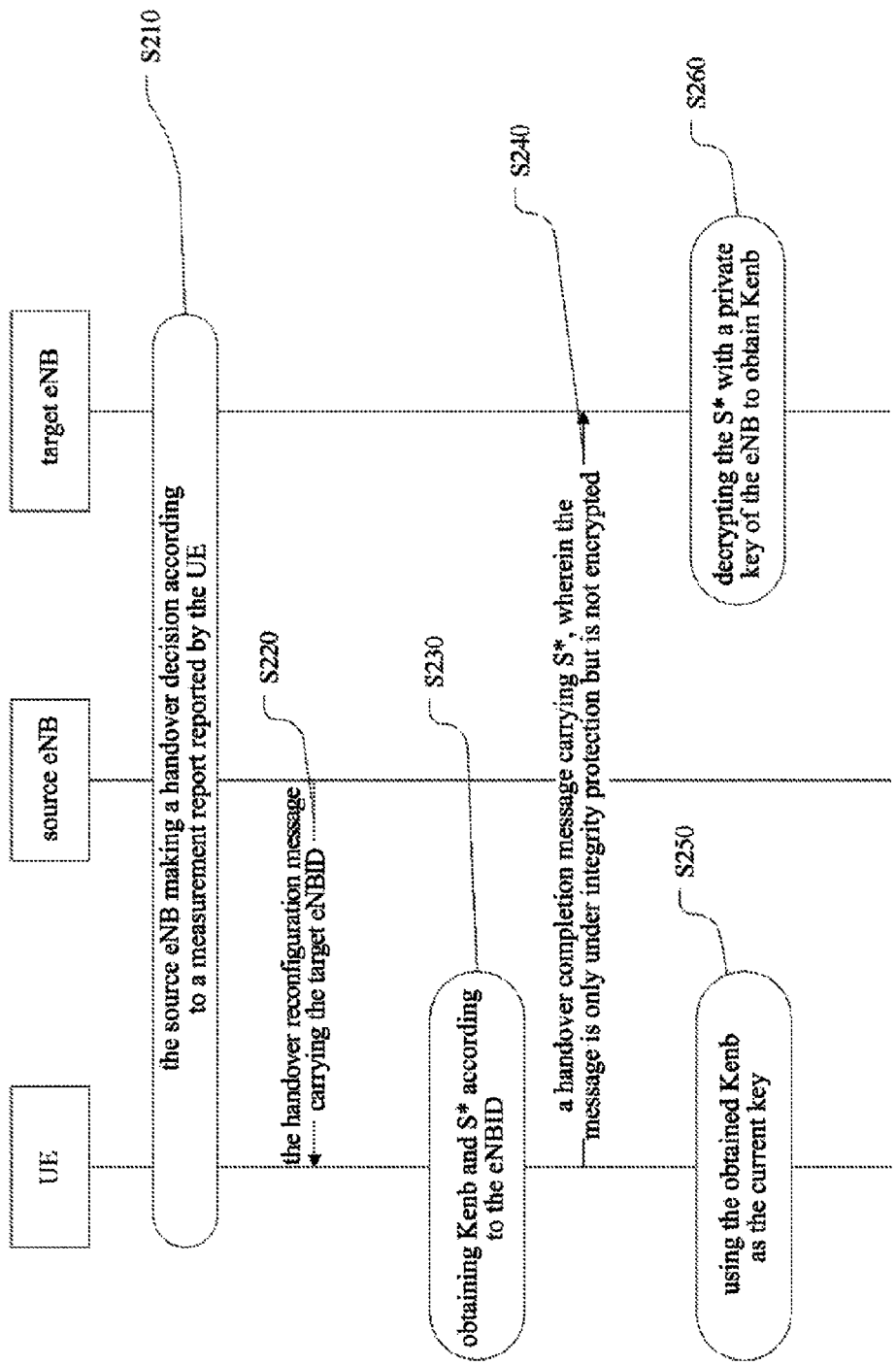
FIG. 2 illustrates the process of generating a key under handover state using handover parameters when the UE hands over according to an embodiment of the present invention.

The third step: on the basis that the UE completes data preparation in the second step, the UE executing the handover process, which further includes the following sub-steps (as shown in FIG. 2):

S210, the eNB of the source cell (i.e., the source eNB) making a handover decision on the UE according to a measurement report reported by the UE, and determining the target cell of the next hop;

S220, the source eNB sending a handover message to the UE, wherein the message carries the eNB identifier eNBID of the eNB of the target cell;

S230, the UE obtaining corresponding Kenb and S* according to the eNBID by using the data in the second step;

S240, the UE carrying S* in a handover completion message and sending it to the eNB of the target cell (i.e., the target eNB), wherein the message is only under integrity protection but is not encrypted;

S250, after receiving S*, the target eNB decrypting the S* with a private key of the eNB to obtain Kenb;

S260, the UE using the Kenb obtained in the third step as the interactive root key of the current eNB.

The fourth step: the UE completing switch, and updating handover data.

After handover is completed, the UE updates its handover data according to the second step.

In the present example, the UE directly sends the cipher text S* corresponding to the target eNB to the target eNB. However, in practical applications, the UE may also send all cipher texts S* and the corresponding eNBID to the source eNB, and during the handover process of the UE, the source eNB sends the cipher text S* corresponding to the target eNB to the target eNB.

In addition, the security of S* can be enhanced by means of MME signing for the Kenb.

In the embodiment of present invention, a system for generating a key in a handover process comprises a UE, a source eNB, a target eNB and a MME, wherein, the MME is used to, according to an evolved Node-B (eNB) of a User Equipment (UE), i.e. a source eNB, obtain all adjacent eNBs of the source eNB, and generate keys for the source eNB and each of the adjacent eNBs respectively, encrypt the keys with a corresponding eNB public key respectively to obtain cipher texts, and send all cipher texts, keys and eNB identifiers to the UE;

the target eNB is used to obtain a cipher text corresponding to the target eNB in the handover process of the UE and decrypt the cipher text with its own private key to obtain the key.

the UE is used to send the cipher text corresponding to the target eNB to the target eNB in the handover process.

Or, the UE is used to send all cipher texts and corresponding eNB identifiers to the source eNB; the source eNB is used to send the cipher text corresponding to the target eNB to the target eNB in the handover process of the UE.

the MME is further used to generate keys for the source eNB and each of the adjacent eNB respectively and then sign for the keys, encrypt the keys with a public key of a corresponding eNB respectively to obtain cipher texts; the target eNB is further used to authenticate with a public key of the MME to obtain the key after decrypting the received cipher text with its own private key.

The present invention will be further described with reference to the specific application examples.

Figure 3:
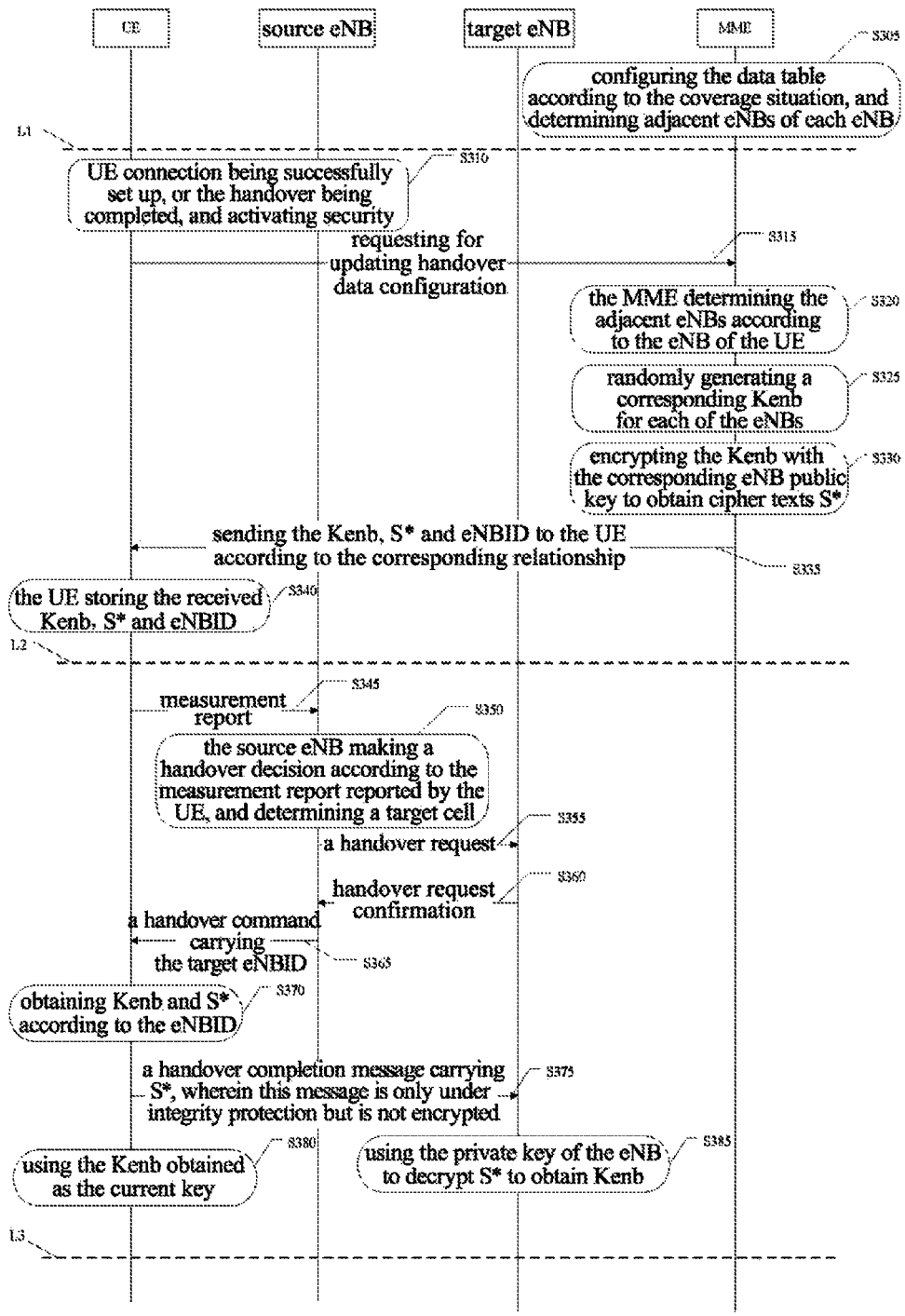
FIG. 3 is a flow chart of the application example one of the present invention.

Application Example One:

FIG. 3 shows the flow chart of the method for generating a key in the UE handover process according to application example one of the present invention.

The three dashed lines L1, L2, L3 divide the whole flow into three stages.

Above L1, it is MME configuration stage which is after practical networking, the adjacency relationship table of the eNB is generated according to the coverage situation of the eNB, which belongs to static data configuration.

Between L1 and L2, it is the stage in which the MME configures handover data for the UE after the UE sets up the connection.

Between L2 and L3, it is the stage in which the key Kenb is generated during the handover process of the UE.

The implementation steps will be described below:

S305: in this step, after the practical networking, all relationships between the eNB and the adjacent eNBs are configured according to the coverage situation of all eNBs. The adjacent eNB meets the following condition: if a UE connected under the source eNB hands over, the relationship between its target eNB and the source eNB is adjacency relationship. According to the above condition, each eNB is bound to be adjacent to a group of eNBs.

S310: when the UE is in the source cell, the connection being successfully set up, or the handover being completed, and activating security. At this moment, the UE is in normal connecting state.

S315: after entering a normal connecting state, the UE applying to the MME for updating handover data through a non-access layer message. Since the non-access layer message is encrypted using a key different from the key for access layer, this message is invisible to the eNB.

S320: the MME determining the adjacent eNBs according to the eNB of the UE.

S325: the MME randomly generating a key Kenb for each of the adjacent eNBs. Since the UE handover occurs between cells, the relationship between the cell and the eNB is that one eNB includes a plurality of cells, the handover may occur within the same eNB (i.e., the source eNB may be the same target eNB), and in order that the UE does not need to consider whether the handover changes the eNB, it is also necessary here to randomly generate a Kenb for the eNB where the UE is located.

S330: the MME encrypting all Kenb generated in S325 with a public key corresponding to the eNB to obtain a group of cipher texts S*.

S335: the MME composing all the above Kenb, S* and eNBID into the non-access layer message, and sending the message to the UE. The message is invisible to the eNB.

S340: the UE storing the received Kenb, S* and eNBID.

S345: the UE reporting a measurement report.

S350: the source eNB making a handover decision for the UE according to the measurement report reported by the UE, and selecting a target cell.

S355: the source eNB sending a handover request to the target eNB.

S360: the target eNB returning a handover request confirmation message.

S365: the source eNB sending a handover configuration command, which carries the eNBID of the target cell, to the UE.

S370: the UE obtaining Kenb and S* from the data stored in step S340 according to the eNBID obtained above.

S375: the UE sending the S* obtained in S370 to the target eNB through a handover completion message. This message is only under integrity protection but is not encrypted.

S380: the UE using the Kenb obtained in S370 as the current key Kenb.

S385: after receiving S*, the target eNB using the private key of the eNB to decrypt S* to obtain Kenb.

After the UE handover is completed, the above steps from S310 to S340 are repeated, and the handover data of the UE next hop are updated.

Application Example Two:

In order to enhance the security of S*, the present invention can also be realized by modifying part of the steps in application example one as follows, and the modified steps are implemented in the following method:

In step S330, the MME may firstly sign for the Kenb, and then use the public key of the eNB to encrypt to obtain the cipher text S*.

In step S385: after receiving the S*, the target eNB firstly decrypts the cipher text S*, and then authenticates with the public key of the corresponding MME, and finally obtains the Kenb.

In this way, the target eNB can verify the correctness of S*, thereby enhancing the security of security information.

Figure 4:
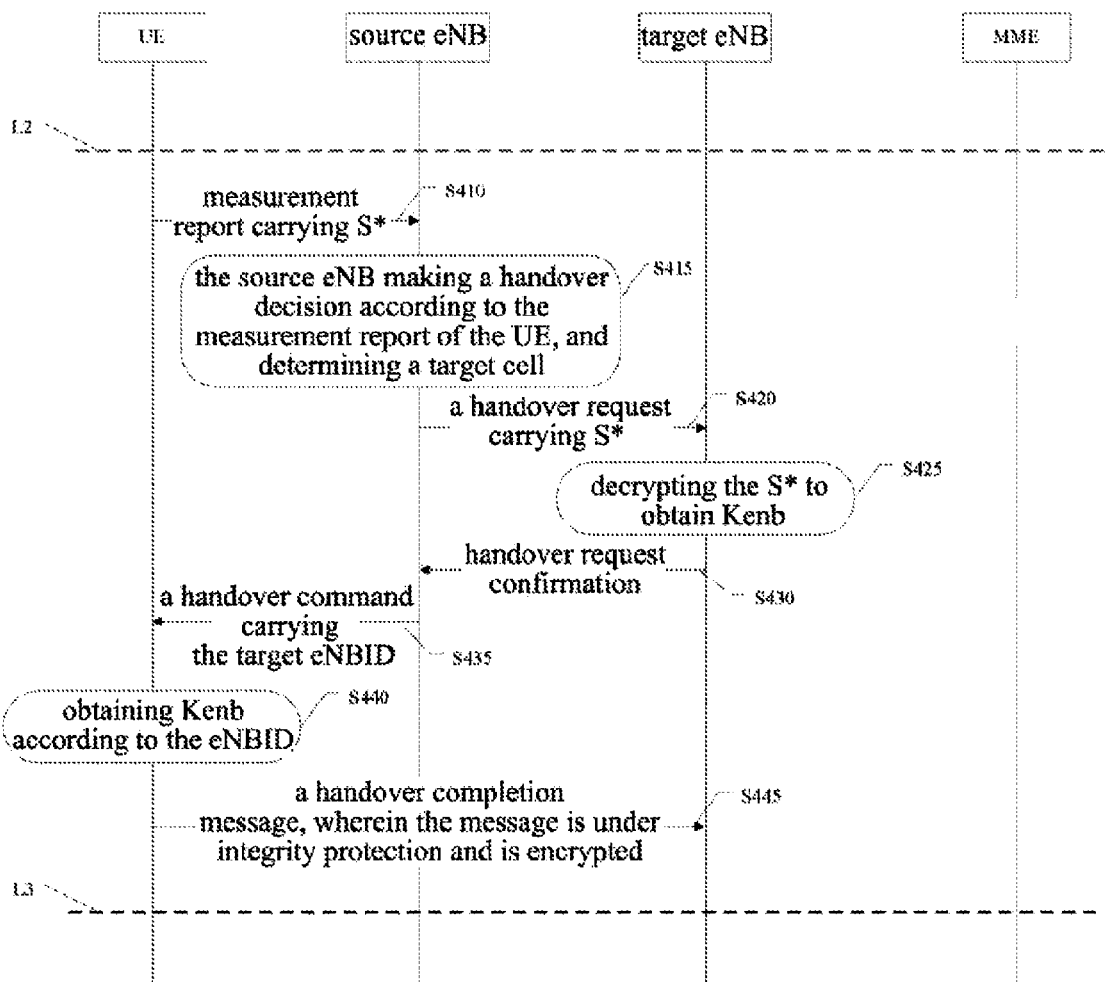
FIG. 4 is a flow chart of the application example three of the present invention.

Application Example Three:

In application example one, the reporting time of the S* is in the handover completion message, but it can also be modified such that the S* is carried in the measurement reporting message. FIG. 4 describes message change between L2 and L3 when S* is reported using a measurement message. The specific implementing steps are as follows:

S410: when the UE reports the measurement report, the report carries all S* and eNBID to the source eNB. Since the measurement report is a relative frequent message, and not every message can carry S*, the UE needs to set certain conditions, and when the conditions are met, the measurement report reported by the UE carries S*. Or, the source eNB can initiatively request the UE to carry S* when reporting the measurement report.

S415: the source eNB making a handover decision according the measurement information of the UE, and determining the target cell.

S420: after determining the target cell, the source eNB obtaining the corresponding S* according to the eNB of the target cell (i.e., the target eNB), and sending S* to the target eNB.

S425: the target eNB decrypting the S* and obtaining Kenb.

S430: the target eNB returning a handover confirmation message to the source eNB.

S435: the source eNB sending a handover command carrying the target eNBID to the UE.

S440: the UE obtaining Kenb according to the eNBID.

S445: the UE sending a handover completion message to the target eNB, wherein the message is under integrity protection and is encrypted.

After handover of the UE is completed, the steps from S310 to S340 are repeated, and the handover data of the UE next hop are updated.

In a word, compared with the prior art, in the present invention, the source eNB cannot know the key Kenb of the next hop, thereby enhancing security, meanwhile, less parameters are needed in key generation, calculations are simple, there is no need for synchronous parameters, the MME does not need to participate in the handover process, thus improving the radio performance of the UE in practical networking.

It should be noted that the present invention is expounded and described by taking a Long-Term Evolution (LTE) architecture as an example, but the method and system for generating a key according to the present invention are not only limited to the LTE architecture, and they are also applicable to key generation in other architectures.

Of course, the present invention may have many other examples, and a person skilled in the art can make various corresponding modifications and deformations based on the present invention without departing from the spirit and essence of the present invention. However, these corresponding modifications and deformations shall fall into the protection scope of the attached claims of the present invention.

INDUSTRIAL APPLICABILITY

The present invention solves the problem in the existing method that the source eNB can know the Kenb of the next hop UE, and the key generating method in the handover process is simplified by completing handover data preparation when the UE is in a non-handover state, and the MME does not need to participate in the handover process, thus improving the radio performance during the handover process.

What is claimed is:

1. A method for generating a key in a handover process, comprising following steps of:

according to an evolved Node-B (eNB) which a User Equipment (UE) is currently located, i.e. a source eNB, a mobility management entity (MME) learning all adjacent eNBs of the source eNB; the MME generating keys for the source eNB and each of the adjacent eNBs respectively; the MME encrypting the keys with a corresponding eNB public key respectively to obtain cipher texts; and the MME sending all cipher texts, keys and eNB identifiers to the UE; and, in a handover process of the UE, a target eNB obtaining a cipher text corresponding to the target eNB from the UE and decrypting the cipher text with the target eNB's own private key to obtain the key;

wherein the cipher text corresponding to the target eNB is directly sent to the target eNB by the UE and the step of the target eNB obtaining the cipher text corresponding to the target eNB from the UE comprises the following steps of:

the source eNB making a handover decision for the UE according to a measurement report reported by the UE, and determining a target cell of a next hop; the source eNB sending a handover message to the UE, wherein the handover message carries a eNB identifier of the target cell, i.e., a target eNB identifier; the UE obtaining the cipher text and key corresponding to the target eNB according to the target eNB identifier, and cipher texts, keys and eNB identifiers that are stored according to corresponding relationships; and, the UE carrying the cipher text corresponding to the target eNB in a handover completion message and sending the handover completion message to the target eNB; the method further comprises the following step after said step of obtaining the key: the UE using the key corresponding to the target eNB as an interactive root key with the target eNB.

2. The method according to claim 1, wherein, the method further comprises a following step before said step of encrypting the keys with a corresponding eNB public key respectively to obtain the cipher texts: the MME signing for the keys; and the method further comprises a following step after said step of decrypting the cipher text with the own private key and before said step of obtaining the key: the target eNB authenticating with a public key of the MME.

3. A method for generating a key in a handover process, comprising following steps of:

according to an evolved Node-B (eNB) which a User Equipment (UE) is currently located, i.e. a source eNB, a mobility management entity (MME) learning all adjacent eNBs of the source eNB; the MME generating keys for the source eNB and each of the adjacent eNBs respectively; the MME encrypting the keys with a corresponding eNB public key respectively to obtain cipher texts; and the MME sending all cipher texts, keys and eNB identifiers to the UE; and, in a handover process of the UE, a target eNB obtaining a cipher text corresponding to the target eNB from the UE and decrypting the cipher text with the target eNB's own private key to obtain the key;

wherein the cipher text corresponding to the target eNB is sent to the target eNB by the source eNB after the UE transmits all cipher texts and corresponding eNB identifiers to the source eNB;

wherein, the step of the target eNB obtaining the cipher text corresponding to the target eNB from the UE comprises following steps of: the UE sending the reported measurement report carrying all cipher texts and corresponding eNB identifiers to the source eNB; the source eNB making a handover decision according to measurement information of the UE and determining a target cell; and, the source eNB obtaining a corresponding cipher text according to the eNB of the target cell, i.e., the target eNB, and sending the cipher text corresponding to the target eNB to the target eNB; the method further comprises following steps after said step of obtaining the key: the target eNB returning a handover confirmation message to the source eNB; the source eNB sending a handover command carrying the target eNB identifier to the UE; and, the UE learning the key corresponding to the target eNB according to the target eNB identifier.

4. The method according to claim 3, wherein, the method further comprises a following step before said step of encrypting the keys with a corresponding eNB public key respectively to obtain the cipher texts: the MME signing for the keys; and the method further comprises a following step after said step of decrypting the cipher text with the own private key and before said step of obtaining the key: the target eNB authenticating with a public key of the MME.

5. A system for generating a key in a handover process, comprising a UE, a source evolved Node-B (eNB), a target eNB and a mobility management entity (MME), wherein the MME is configured to: according to an evolved Node-B (eNB) which a User Equipment (UE) is currently located, i.e. a source eNB, learn all adjacent eNBs of the source eNB, and generate keys for the source eNB and each of the adjacent eNBs respectively, encrypt the keys with a corresponding eNB public key respectively to obtain cipher texts, and send all cipher texts, keys and eNB identifiers to the UE; the target eNB is configured to: in the handover process of the UE, obtain a cipher text corresponding to the target eNB and decrypt the cipher text with the target eNB's own private key to obtain the key;

wherein the cipher text corresponding to the target eNB is directly sent to the target eNB by the UE and the target eNB obtaining the cipher text corresponding to the target eNB from the UE comprises:

the source eNB making a handover decision for the UE according to a measurement report reported by the UE, and determining a target cell of a next hop;

the source eNB sending a handover message to the UE, wherein the handover message carries a eNB identifier of the target cell, i.e., a target eNB identifier;

the UE obtaining the cipher text and key corresponding to the target eNB according to the target eNB identifier, and cipher texts, keys and eNB identifiers that are stored according to corresponding relationships; and, the UE carrying the cipher text corresponding to the target eNB in a handover completion message and sending the handover completion message to the target eNB; wherein, after obtaining the key, the UE using the key corresponding to the target eNB as an interactive root key with the target eNB.

6. The system according to claim 5, wherein, the MME is also configured to: sign for the keys before encrypting the keys with the corresponding eNB public key respectively to obtain the cipher texts;

the target eNB is also configured to: authenticate with a public key of the MME after decrypting received cipher texts with the own private key and before obtaining the key.

7. A system for generating a key in a handover process, comprising a UE, a source evolved Node-B (eNB), a target eNB and a mobility management entity (MME), wherein the MME is configured to: according to an evolved Node-B (eNB) which a User Equipment (UE) is currently located, i.e. a source eNB, learn all adjacent eNBs of the source eNB, and generate keys for the source eNB and each of the adjacent eNBs respectively, encrypt the keys with a corresponding eNB public key respectively to obtain cipher texts, and send all cipher texts, keys and eNB identifiers to the UE; the target eNB is configured to: in the handover process of the UE, obtain a cipher text corresponding to the target eNB and decrypt the cipher text with the target eNB's own private key to obtain the key; wherein the cipher text corresponding to the target eNB is sent to the target eNB by the source eNB after the UE transmits all cipher texts and corresponding eNB identifiers to the source eNB; wherein the target eNB obtaining the cipher text corresponding to the target eNB from the UE comprises: the UE sending the reported measurement report carrying all cipher texts and corresponding eNB identifiers to the source eNB; the source eNB making a handover decision according to measurement information of the UE and determining a target cell; and, the source eNB obtaining a corresponding cipher text according to the eNB of the target cell, i.e., the target eNB, and sending the cipher text corresponding to the target eNB to the target eNB; wherein, after obtaining the key, the target eNB returning a handover confirmation message to the source eNB; the source eNB sending a handover command carrying the target eNB identifier to the UE; and, the UE learning the key corresponding to the target eNB according to the target eNB identifier.

* * * * *